(12) United States Patent
Pauken

(10) Patent No.: US 8,444,198 B2
(45) Date of Patent: May 21, 2013

(54) DEPLOYABLE TRUNK STOWAGE SYSTEM FOR VEHICLE

(75) Inventor: Junko Pauken, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/712,333

(22) Filed: Feb. 25, 2010

(65) Prior Publication Data

US 2011/0204668 A1 Aug. 25, 2011

(51) Int. Cl.
*B60R 7/00* (2006.01)

(52) U.S. Cl.
USPC .......... 296/37.7; 296/37.1; 224/309; 224/311

(58) Field of Classification Search
USPC . 224/282, 309, 310, 311, 320, 545; 296/37.1, 296/37.5, 37.7
See application file for complete search history.

(56) References Cited

U.S. PATENT DOCUMENTS

| | | | |
|---|---|---|---|
| 4,832,242 A | 5/1989 | Leek | |
| 4,941,718 A * | 7/1990 | Alexander et al. | 312/312 |
| 5,992,718 A * | 11/1999 | Zaranek | 224/311 |
| 6,027,155 A | 2/2000 | Wisniewski et al. | |
| 6,502,731 B1 * | 1/2003 | Gehring et al. | 224/553 |
| 6,733,061 B1 * | 5/2004 | Dykema et al. | 296/37.7 |
| 7,150,481 B2 | 12/2006 | Knieper | |
| 7,661,741 B2 * | 2/2010 | Takai | 296/37.1 |
| 2006/0180622 A1 * | 8/2006 | Dexter | 224/314 |
| 2007/0187969 A1 * | 8/2007 | Dowd et al. | 296/37.1 |
| 2009/0045645 A1 * | 2/2009 | Bohlke et al. | 296/37.5 |
| 2012/0119458 A1 * | 5/2012 | Simoes | 280/33.998 |

* cited by examiner

*Primary Examiner* — Glenn Dayoan
*Assistant Examiner* — Jason S Daniels
(74) *Attorney, Agent, or Firm* — Shook Hardy & Bacon LLP

(57) ABSTRACT

A storage bin attached to the upper wall of a vehicle trunk. The storage bin is movable between a stowed position in which the bin is moved upward and is locked against the upper wall of the trunk and a deployed position in which the bin is moved downward and is open for storage of one or more items. When moving between a stowed position and a deployed position, the bin might pivot or sides of the bin might collapse.

17 Claims, 4 Drawing Sheets ized storage bin that may filled with any of a variety of objects then
DEPLOYABLE TRUNK STOWAGE SYSTEM FOR VEHICLE

TECHNICAL FIELD

The disclosed invention relates generally to storage areas for vehicles. More particularly, the disclosed invention relates to a storage area for the trunk of a vehicle that defines a storage bin pivotably attached to the upper wall of the trunk. The storage bin is movable between a closed or stowed position in which the bin is pivotably moved upward and is locked against the upper wall of the trunk and an open or deployed position in which the bin is pivotably moved downward and is open for storage of one or more items. An alternative arrangement is provided in which the storage bin comprises a top wall, a bottom wall and a pair of opposed flexible walls that allow the bottom wall to be moved upward to its stowed position and fastened to the top wall when not in use. The storage bin of the disclosed invention may be fitted to any upper surface of a storage area of the vehicle in addition to the trunk area.

BACKGROUND OF THE INVENTION

The provision of adequate and practical storage space in vehicles has been a great challenge to automobile designers since the early days of motoring. Early vehicles provided only room for the driver and one or more passengers and whatever they could hold in their laps or place on the vehicle floor. Some vehicles had small storage areas under the rear seat. Occasionally vehicles were fitted with external trunks, initially in the form of wicker baskets and later having solid fiberboard walls. Once running boards appeared on vehicles accessory demountable luggage racks became available to hold one or more pieces of luggage. Some early cars, such as the Ford Model T Runabout, had small trunks (or "turtle decks") that usually could hold little more than the driver's lunch, some tools, and a few spare parts. (Some early vehicles were truck models that ordinarily offered a large, uncovered area for storage. Such storage areas, while large, were not practical for all applications. The same situation exists today.)

As the motor vehicle developed two models began to appear, the station wagon and the sedan. The rear area of the station wagon was often designed to include an extra seat or two for children but was otherwise used for storage. The sedan (or convertible) had a trunk designed for the storage of the vehicle spare tire and any goods the operator wanted to move.

While other vehicle body styles are now common, such as the sport utility vehicle, one problem persists, and that is the inefficient use of storage space. This is primarily the case in the typical sedan (or convertible). While trunk storage space is often large the entire area is rarely used. When the trunk floor is filled with goods any additional goods are simply—and often impractically—piled one-atop the other over the goods on the trunk floor.

Accordingly, as in so many areas of vehicle technology, there is room in the art of vehicle trunk design for an alternative and practical configuration that would allow more efficient and complete use of the area of the vehicle trunk.

SUMMARY OF THE INVENTION

The present invention generally provides a storage area for a vehicle. The storage area includes a roof and a storage bin movably attached to the roof. The roof is preferably the roof of the vehicle trunk but may be the roof of other portions of the vehicle.

The storage bin has a top wall, a bottom wall, a first side immovably fixed to the top wall and bottom wall and a second side immovably fixed to the top wall and the bottom wall. Optionally the top wall may be left out yet the side walls are still immovably fixed to the bottom wall.

A storage area structure is provided to which the roof is attached. A bin-receiving opening is formed in the roof of the storage area. The storage bin is movably attached to the storage area structure such that the storage bin is selectively movable between a closed or stowed position and an open or deployed position. A latch is provided for retaining the storage bin in its stowed position. When the latch is released the storage pin moves to its deployed position.

The storage bin is attached to the storage bin structure preferably by pivot points. Particularly, a first pivot point connects the first wall of the storage bin to the storage area structure and a second pivot point connects the second wall of the storage bin to the storage area structure.

As an alternative arrangement, the storage bin may comprise a top wall, a bottom wall and a pair of opposed flexible walls that allow the bottom wall to be moved upward to its stowed position and fastened to the top wall when not in use.

A single large storage bin may be provided or a plurality of bins of the same or different sizes may be provided.

The disclosed invention greatly expands the usable storage space of the vehicle trunk by providing a selectively movable storage bin that may filled with any of a variety of objects then conveniently closed when not in use.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
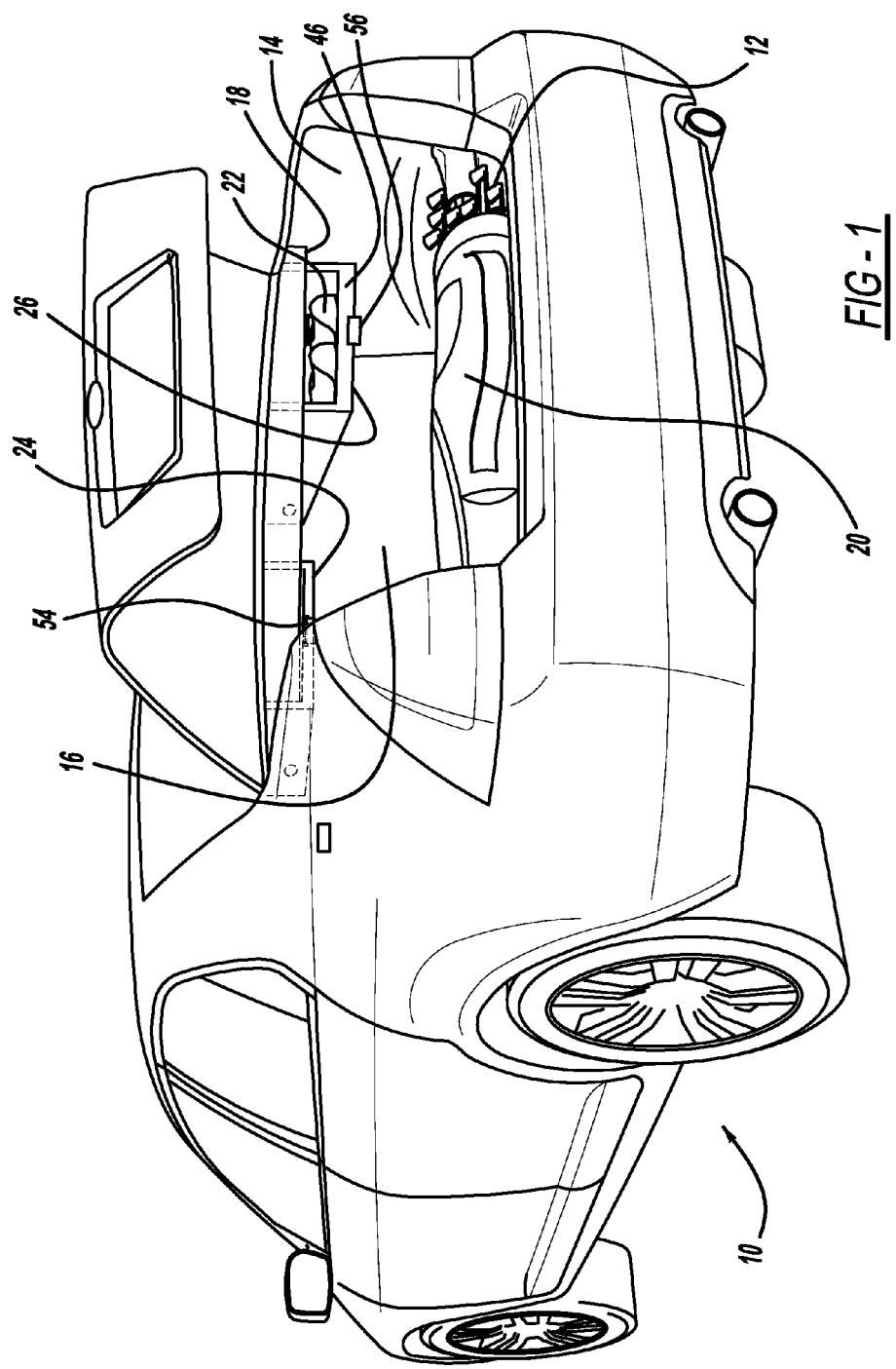
FIG. 1 illustrates a partial perspective view of an open vehicle trunk being fitted with side-by-side pivotable storage bins of the present invention in which one of the bins is in its deployed or open position and the other bin is in its stowed or closed position.

In the following figures, the same reference numerals will be used to refer to the same components. In the following description, various operating parameters and components are described for different constructed embodiments. These specific parameters and components are included as examples and are not meant to be limiting.

Figure 2:
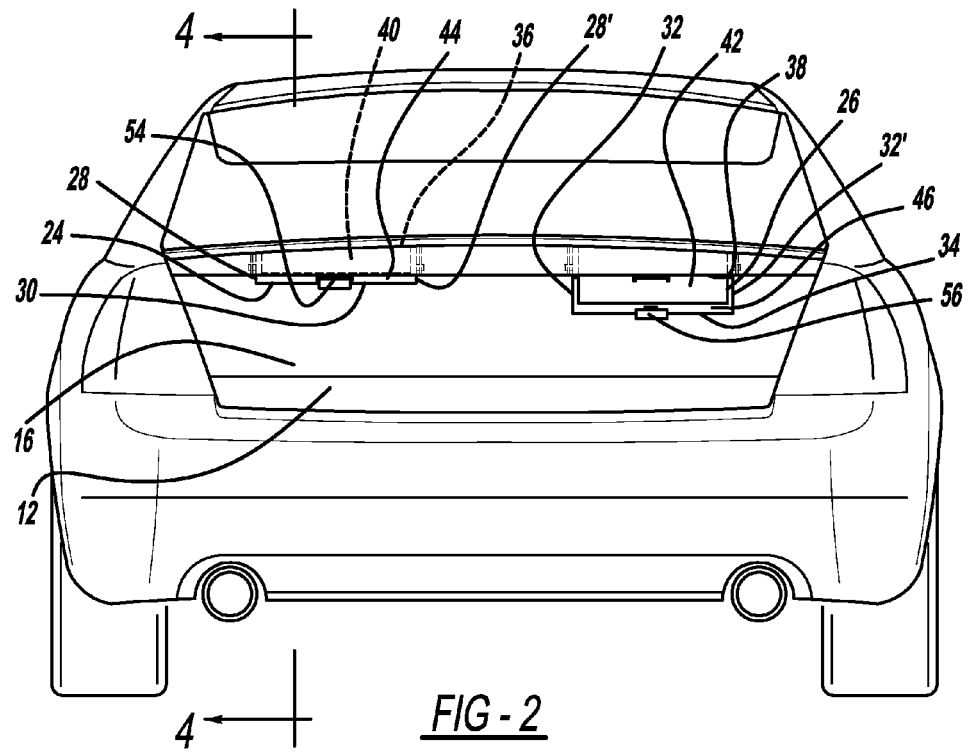
FIG. 2 is an end view of an open trunk illustrating both bins in their deployed and open positions.

Referring to FIGS. 1 and 2, a vehicle storage area, generally illustrated as 10, is shown. While the vehicle storage area 10 is shown as being the trunk of a vehicle it is to be understood that the vehicle storage area 10 may well be the rear area of a so-called cross-over vehicle or a sport utility vehicle. The disclosed storage area is thus not to be limited to use in the illustrated trunk area of the vehicle but may have broader applications and uses.

The vehicle storage area 10 includes a floor 12, opposed side walls 14 and 14', a back wall 16, and a top or roof wall 18. The shapes and sizes of the opposed side walls (of which one opposed side wall 14 can be seen), the back wall 16 and the top wall 18 may well vary from those shown which are provided for illustrative purposes and are not intended as being limiting.

The top wall 18 of the vehicle storage area 10 is normally provided to complete the enclosure of the vehicle storage area 10. As such it is "wasted" space and is not used for storage. As shown, cargo 20, such as the exemplary golf bag, is merely rested upon the floor 12. Any additional cargo would be placed adjacent to the first-placed cargo (in this case, the golf bag) or would be placed on top of the first-placed cargo.

In the case where the user wants to store additional cargo and would prefer not having to rest it on the first-placed cargo, added storage space is needed. In the particular instance, the user has a pair of golf shoes 22 which are perhaps muddy or wet or both. For understandable reasons the user does not want to place the muddy or wet golf shoes 22 in, next to or on top of the golf bag 20. Perhaps the user could place the golf shoes 22 in a plastic bag but this is not a desirable solution.

Instead, the vehicle storage area 10 includes a first stowable storage bin 24 and a second stowable storage bin 26. The number, shape and size of the storage bins 24 and 26 are shown in the figures for illustrative purposes only and are not intended as being limiting. For example, only a single storage bin may be used and it may be less than half the width of the top wall 18 (as is the case with the storage bins 24 and 26) or may be as wide as more than half the width of the top wall 18. In addition, the openings of the storage bins may be wider or narrower or taller or shorter than the openings of the storage bins 24 and 26.

While the storage bin 24 is shown as having golf shoes 22 placed therein the only limitation as to the items that can be stored in the storage bin 24 (or 26) is limited only by the size of the bins. One of the storage bins 24 and 26 may also be dedicated by the manufacturer for use by specialty items and may be configured accordingly. Such specialty items might include safety flares, a tool kit, or a plug-in tire sealer/inflator mechanism known today as a substitute for spare tires.

The first stowable storage bin 24 and the second stowable storage bin 26 are each movable between a stowed or closed position and a deployed or open position. Both positions are illustrated in FIG. 1 in which the first stowable storage bin 24 is in the deployed or open position and the second stowable storage bin 26 is in the stowed or closed position. As illustrated, when the stowable storage bin is in its stowed or closed position (in this case, the second stowable storage bin 26), the bin is almost entirely moved out of the way of other cargo.

Figure 3:
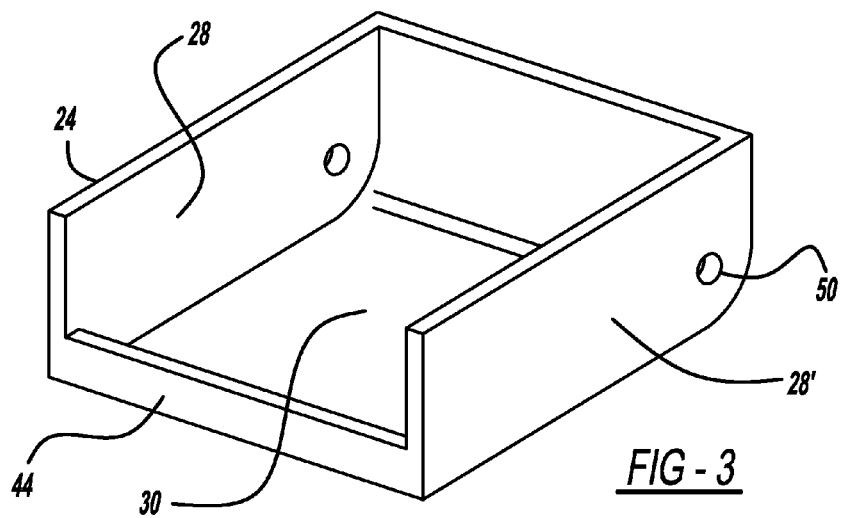
FIG. 3 is a perspective view illustrating a first embodiment of a storage bin according to the disclosed invention.

The stowable storage bins 24 and 26 include both side and bottom walls. Particularly, and as illustrated in FIG. 3, the stowable storage bin 24 includes a pair of opposed side walls 28 and 28' and a bottom wall 30 while the stowable storage bin 26 includes a pair of opposed side walls 32 and 32' and a bottom wall 34. These are well illustrated in FIG. 2.

The storage bins 24 and 26 may optionally each include top walls 36 and 38, respectively. The storage bins 24 and 26 may optionally each include end walls 40 and 42, respectively. One or more of the bottom or side walls (and top and end walls where provided) may be solid or may have openings to allow for air circulation.

To provide maximum structural integrity, the bottom wall 30 of the stowable storage bin 24 is fixedly and immovably attached to the opposed side walls 28 and 28'. In the same way the bottom wall 34 of the stowable storage bin 26 is fixedly and immovably attached to the opposed side walls 32 and 32'. When the top wall 36 is provided, the opposed side walls 28 and 28' of the stowable storage bin 24 are fixedly and immovably attached thereto. When the top wall 38 is provided, the opposed side walls 32 and 32' of the stowable storage bin 26 are fixedly and immovably attached thereto.

While not shown one or both of the storage bins 24 and 26 may include a movable front wall or door (not shown). In lieu of the door (or in addition to the door) one or both of the storage bins 24 and 26 may include an article-retaining lip 44 and 46, respectively.

The stowable storage bin is pivotably attached to the vehicle storage area 10. This arrangement is more clearly shown in FIG. 4 which is taken along line 4-4 of FIG. 2. The illustrated storage bin 24 is shown in its deployed or open position. The vehicle storage area 10 includes a storage area structure 48 to which the stowable storage bin 24 is pivotably attached at pivot point 50. The pivot point 50 connects the wall 28 to the storage area structure 48. While only one pivot point 50 is shown it is to be understood that another pivot point is provided to attach the wall 28' to the storage area structure 48.

An opening 52 is formed in the top wall 18 to receive the storage bin 24 when moved to its stowed position. By providing an opening that is very close in size to the outer dimensions of the storage bin 24 a tight seal can be provided between the opening 52 and the storage bin 24 when the storage bin 24 is in its stowed position.

Figure 4:
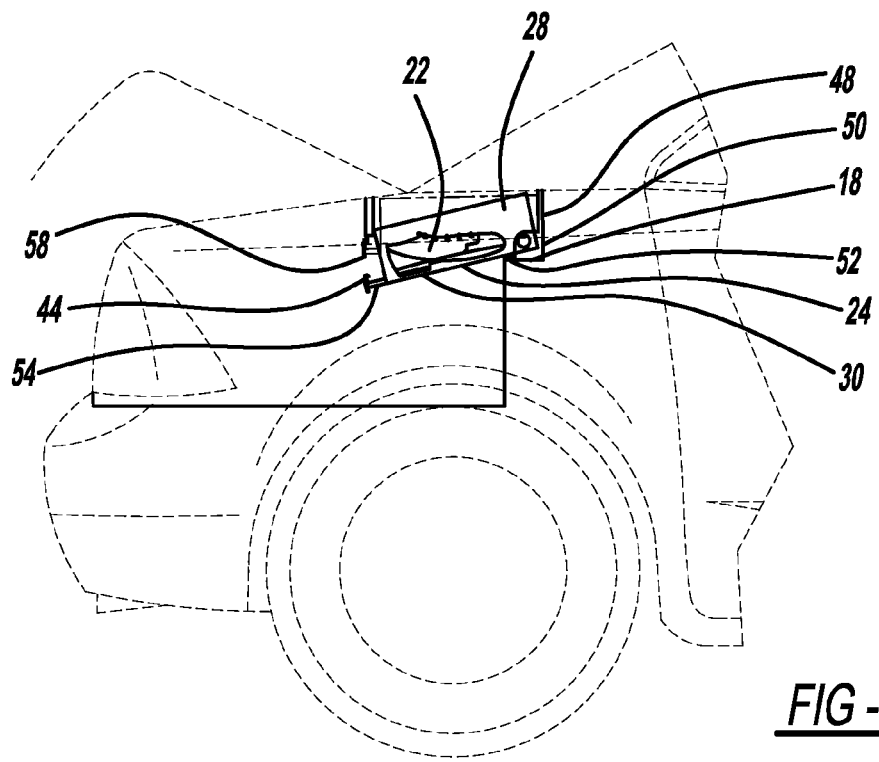
FIG. 4 is a sectional view taken along lines 4-4 of FIG. 2 and illustrating the attachment of one of the bins to the vehicle trunk area.

To retain the stowable storage bins 24 and 26 in their stowed position when the operator selectively moves them there, a latch is provided and is attached to the front of the bin. Particularly, a latch 54 is attached to the front of the stowable storage bin 24 while a latch 56 is attached to the front of the stowable storage bin 26. A latch-receiving element is provided for engagement with the latch. An example of such a latch-receiving element is illustrated in FIG. 4 in which a latch receiving element 58 is shown attached to the top wall 18 for selectively receiving and holding the latch 54 as is known in the art.

The stowable storage bins 24 and 26 of the disclosed invention may be composed of any one of several materials, including a hard polymerized material or a metal or any combination of such materials.

The storage bins 24 and 26 shown in FIGS. 1 through 4 and described in conjunction therewith provide a first solution to the need for additional and stowable storage space in the vehicle trunk. A second solution according to the disclosed invention is set forth in FIGS. 5 through 7.

Figure 5:
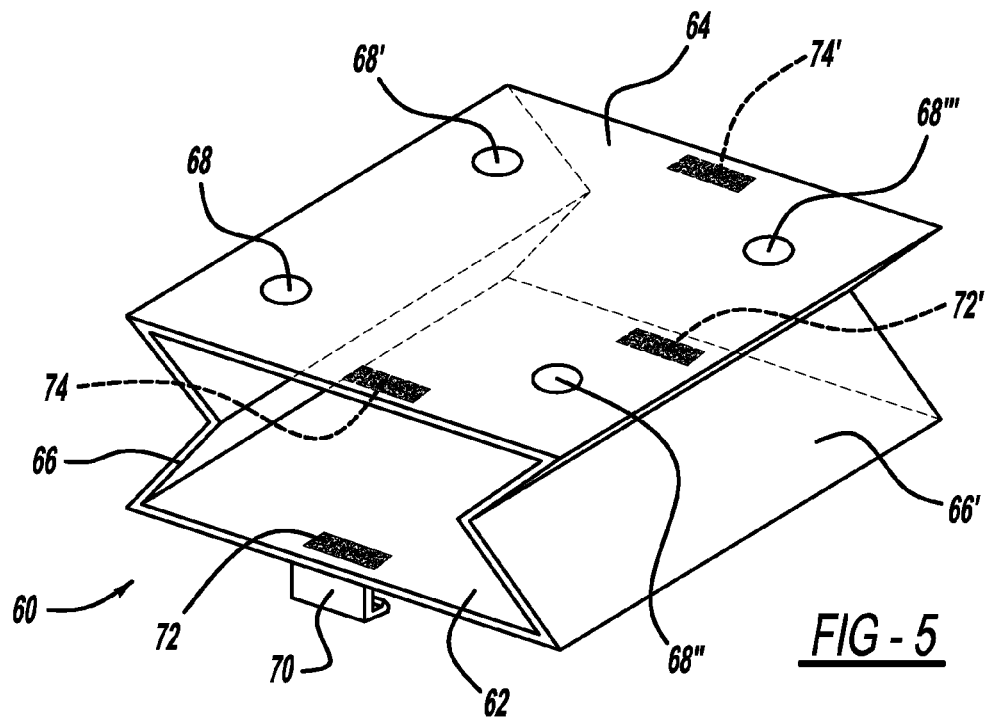
FIG. 5 is a perspective view illustrating a second embodiment of a storage bin according to the disclosed invention.

With respect to FIG. 5, a storage bin, generally illustrated as 60, is shown in perspective view. The storage bin 60 includes a bottom wall 62, a top wall 64, a first collapsible side wall 66 and a second collapsible side wall 66'. The top wall 64 is attached to the vehicle (not shown in FIG. 5) by fasteners such as bolts or screws. A series of attachment holes 68, 68', 68" and 68"' are optionally provided for this purpose. Of course other methods of attachment may be used as is known in the art. In addition, in lieu of the top wall 64, the upper ends of the first collapsible side wall 66 and the second collapsible side wall 66' may have edges or tabs for attachment to the vehicle (not shown).

The bottom wall 62 and the top wall 64 (when provided) are preferably made from a hard plastic or from vinyl-covered cardboard to provide strength and rigidity while adding minimal weight to the vehicle. The first collapsible side wall 66 and the second collapsible side wall 66' are composed of a material that allows movement of the storage bin 60 between a stowed position and a deployed position as will be discussed below. The first collapsible side wall 66 and the second collapsible side wall 66' are composed of flexible material or, alternatively, may each be composed of a substantially rigid upper panel hingedly attached to a substantially rigid lower panel.

An operator-usable handle 70 is provided and is attached to the front end of the bottom wall 62. A temporary fastener such as a latch system or a hook-and-loop fastening arrangement is provided to hold the bottom wall 62 substantially in place against the top 64 when the storage bin 60 is not in use. For example, a pair of hook portions 72 and 72' of a hook-and-loop fastening system is attached to the upper side of the bottom wall 62 while a pair of loop portions 74 and 74' of a hook-and-loop fastening system is attached to the underside of the top wall 64.

Figure 6:
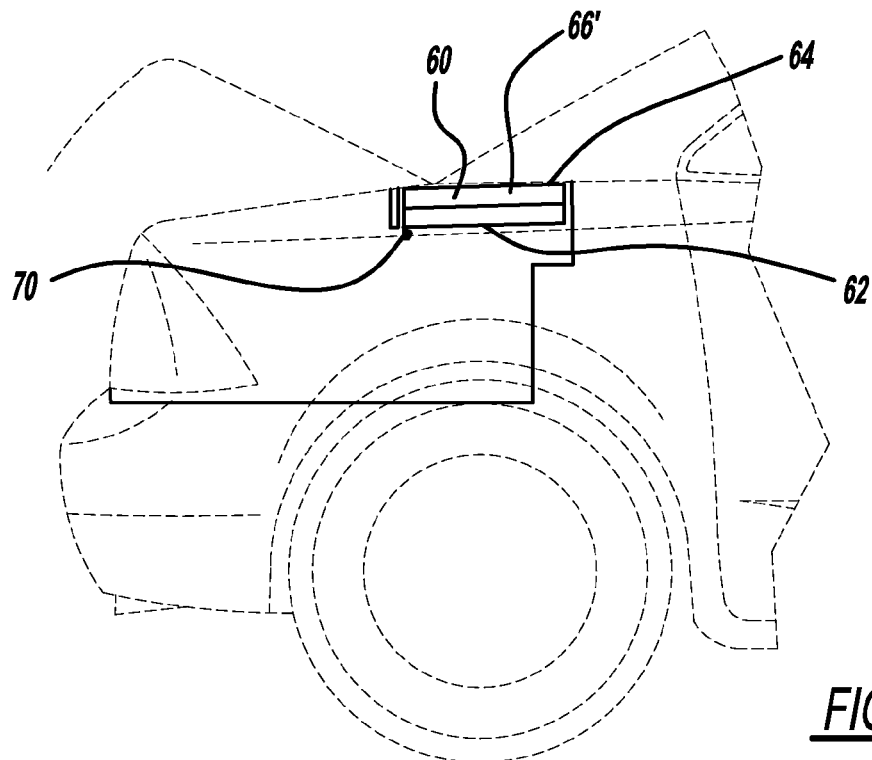
FIG. 6 is a sectional view similar to that of FIG. 4 but showing the embodiment of the storage bin of FIG. 5 in its stowed position.

Accordingly, when the operator does not need the extra space provided by the storage bin 60 and desires to have the storage bin 60 moved out of the way, the operator moves the bottom wall 62 upward until the bottom wall 62 is locked into place by, for example, attachment of the hook portions 72 and 72' to the loop portions 74 and 74' respectively of the hook-and-loop fastening system described above. The stowed position of the storage bin 60 is illustrated in FIG. 6.

Figure 7:
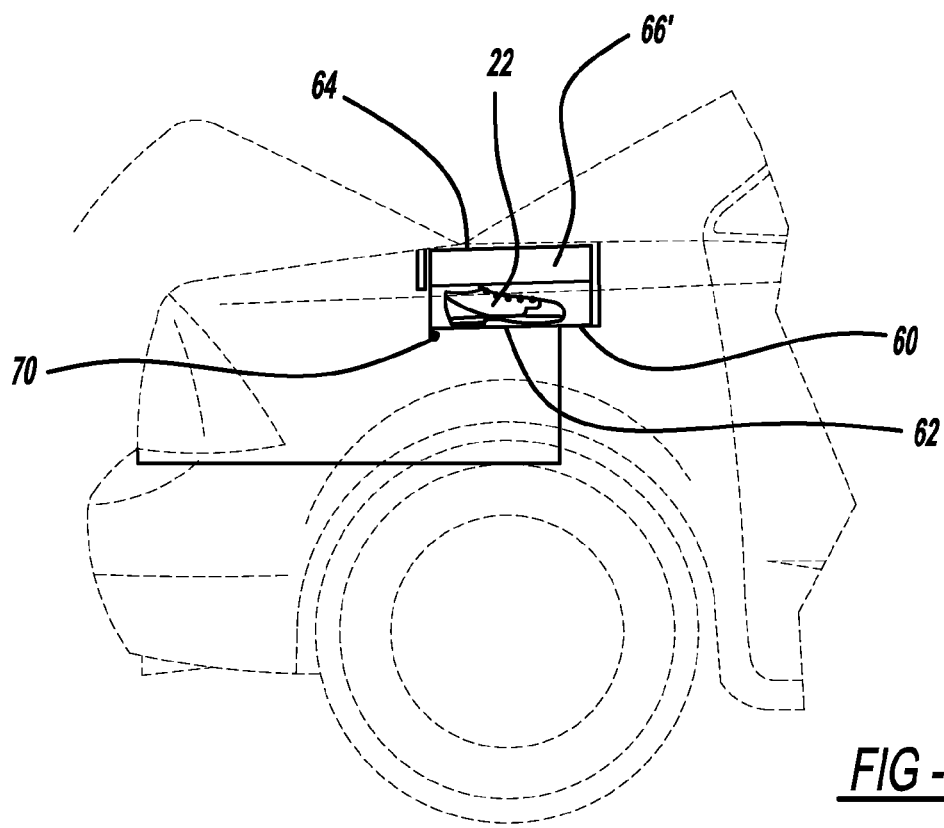
FIG. 7 is a view similar to that of FIG. 6 but showing the embodiment of the storage bin of FIG. 5 in its deployed position.

When the additional storage spaced provided by the storage bin 60 is needed by the operator, the handle 70 is used to pull the bottom wall 62 from its locked position with respect to the top wall 64, thus allowing the storage bin 60 to be extended to its deployed position as illustrated in FIG. 7.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A storage area in a trunk of a vehicle, the storage area comprising:
    a trunk top wall that includes a bin-receiving opening;
    a storage bin movably attached to said trunk top wall, such that the storage bin is movable from an open position to a closed position in which the storage bin is stowed in the bin-receiving opening, said bin having a bottom, a first side fixed to said bottom, and a second side fixed to said bottom, wherein the bottom and the trunk top wall comprise a temporary fastener that is engaged to hold the storage bin in the closed position.

2. The storage area of claim 1 wherein said storage bin is pivotably movable between the closed position and the open position.

3. The storage area of claim 1 wherein said first and second sides are collapsible.

4. The storage area of claim 1, wherein the trunk top wall includes a storage area structure.

5. The storage area of claim 4 including a first pivot point connecting said first side to said storage area structure.

6. The storage area of claim 5 including a second pivot point connecting said second side to said storage area structure.

7. The storage area of claim 6 wherein said storage bin is pivotably movable between the open position and the closed position.

8. The storage area of claim 7 including a latch for retaining said storage bin in said stowed position.

9. A storage system for a vehicle trunk, which includes a top wall with an opening, the system comprising:
    a storage bin movably attached to the top wall of the vehicle trunk, such that the storage bin pivots between a deployed position and a stowed position in which the storage bin is at least partially positioned within the opening of the top wall,
    wherein the storage bin includes a bottom, a first side, a second side, and an article retaining lip that extends from the bottom and extends between the first side and second side,
    wherein the bottom and the trunk top wall comprise a temporary fastener that is engaged to hold the storage bin in the closed position; and
    wherein the article-retaining lip includes a height that is lower than a side-wall height and the article-retaining lip retains an article in the storage bin when the storage bin is in a deployed position.

10. The storage system of claim 9 including a storage area structure.

11. The storage system of claim 10 including a first pivot point connecting said first side to said storage area structure.

12. The storage system of claim 11 including a second pivot point connecting said second side to said storage area structure.

13. The storage system of claim 12 wherein said storage bin is pivotably movable between a stowed position and a deployed position.

14. The storage system of claim 13 including a latch for retaining said storage bin in said stowed position.

15. A storage system for a vehicle trunk, which includes a trunk top wall, the system comprising:
    a storage bin that attaches to the trunk top wall and that is comprised of a bottom wall, a top wall, a first side wall, and a second side wall,
    wherein the first side wall and the second side wall are collapsible, such that the bottom wall moves toward the top wall when being moved to a stowed position, and
    wherein the bottom wall comprises a temporary fastener that engages with the top wall to hold the bottom wall in the stowed position.

16. The storage system of claim 15 wherein the temporary fastener is comprised of hook-and-loop strips that are positioned on the top wall and the bottom wall and that are engaged when the bottom is in the stowed position.

17. The storage system of claim 15 including a latch for retaining said storage bin in said stowed position.

* * * * *